United States Patent [19]

Lynn

[11] Patent Number: 5,518,284
[45] Date of Patent: May 21, 1996

[54] HAND HELD GARDEN TOOL AND METHOD

[76] Inventor: Claudia S. Lynn, 635 Clark's Tract, Keswick, Va. 22947

[21] Appl. No.: 401,144

[22] Filed: Mar. 8, 1995

Related U.S. Application Data

[63] Continuation-in-part of Ser. No. 231,466, Apr. 22, 1994, Pat. No. 5,425,563.

[51] Int. Cl.$^6$ .................. A01B 1/16; A01D 7/02
[52] U.S. Cl. ............... 294/50.6; 294/26; 294/57; 172/378
[58] Field of Search ................ 294/15, 25, 26, 294/51, 50.6, 55, 55.5, 57, 58; 172/371, 378

[56] References Cited

U.S. PATENT DOCUMENTS

| | | | |
|---|---|---|---|
| 1,836,545 | 12/1931 | Normand | 294/26 |
| 2,278,610 | 4/1942 | Brownson et al. | 294/25 |
| 2,330,679 | 9/1943 | Church | 172/378 |
| 2,623,772 | 12/1952 | Johnson | 294/26 |
| 2,710,571 | 6/1955 | Pfister | 294/55.5 |
| 3,293,674 | 12/1966 | Sapia | 294/50.6 |
| 3,477,756 | 11/1969 | Castro | 294/25 |
| 3,847,226 | 11/1974 | Long | 294/50.6 |
| 3,868,775 | 3/1975 | Anderson | 294/51 |
| 4,061,387 | 12/1977 | Lindbergh | 294/26 |

*Primary Examiner*—Dean Kramer
*Attorney, Agent, or Firm*—William E. Mouzavires

[57] ABSTRACT

A weeding or garden tool with a handle fitting comfortably in the palm and supported by the middle, fore and index fingers. The tool further includes one or more tines extending forwardly from the handle and a support on the tines for receiving the middle fingers so that the tines, in effect, form extensions of the outstretched hands.

16 Claims, 3 Drawing Sheets

HAND HELD GARDEN TOOL AND METHOD

RELATED APPLICATION

This application is a continuation-in-part of my prior application, Ser. No. 08/231,466, filed Apr. 22, 1994 now U.S. Pat. No. 5,425,563 and entitled HAND HELD GARDEN TOOL AND METHOD.

OBJECTS AND SUMMARY OF INVENTION

The present invention relates to hand held garden or weeding tools and a method of weeding through use of the tool. The majority of hand held weeding tools are generally gripped on the handle protruding perpendicular from the rear of the tool.ABbr Tools of this kind can be tiresome to grip over periods of time.

An object of the present invention is to provide a novel and improved hand held garden weeder tool or spade that is comfortable to hold and operate and will reduce hand fatigue.

Another object of the invention is to provide a novel and improved method of utilizing a hand tool for weeding or gardening.

Another object is to provide such a tool as described above and which can be economically manufactured for retail at low cost.

The preferred embodiment of this invention provides a weeding or garden tool with a handle fitting comfortably in the palm and supported by one or more of the middle, fore and index fingers. The tool further includes one or more tines extending forwardly from the handle and support means on the tines for receiving the fingers so that the tines, in effect, form extensions of the outstretched hands.

DRAWINGS

Other objects and advantages of this invention will be apparent from the following more detailed description taken in conjunction with the accompanying drawings in which.

DETAILED DESCRIPTION

Figure 1:
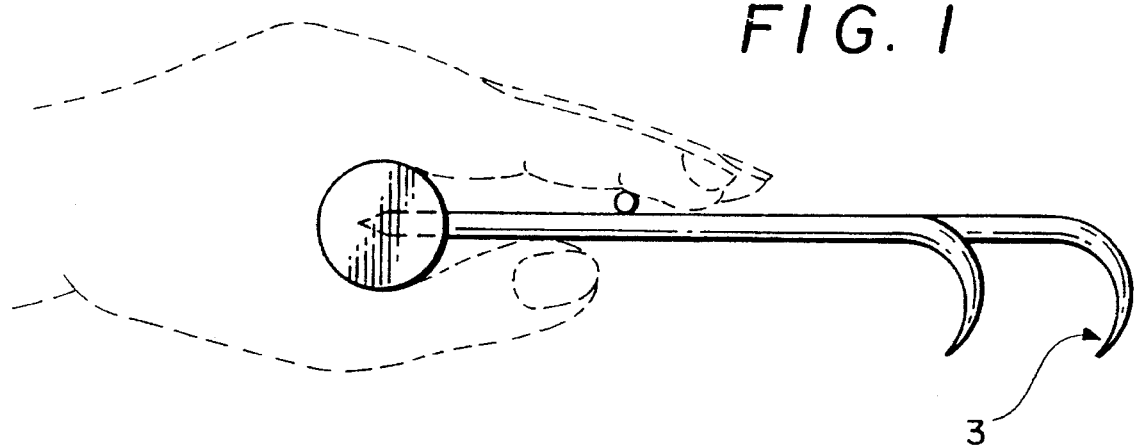
FIG. 1 is a side elevational view of a garden or weeding tool showing one method of holding or gripping the tool in the hand, the latter being shown in dotted lines.
Figure 2:
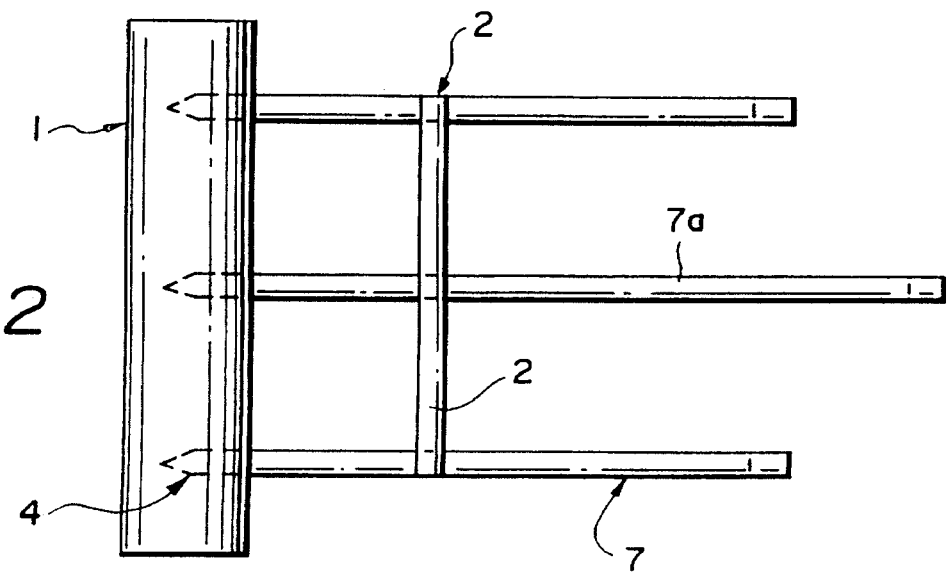
FIG. 2 is a top view of the weeding tool excluding the hand shown in FIG. 1.
Figure 3:
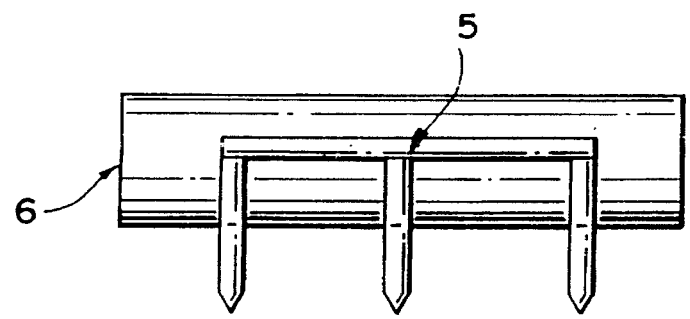
FIG. 3 is an end or front view of the tool.

Referring now to the drawings in detail there is shown in FIGS. 1–3, for illustrative purposes only, a hand held garden or weeding tool including a T-bar handle that may have a cylindrical shape and sufficient length to extend transversely in the hand to be conveniently held as shown in FIG. 1. One or more but preferably three tines 7 are fixed to the handle and project therefrom in parallel and at right angles to the handle 1. In the preferred embodiment, the ends of the tines 7 are formed with hooks or claws extending downwardly with an inside diameter of ¾" to 1 ¼" (inches) for engaging and rooting out earth and weeds or other growths as may be desired. In addition, it is preferred that the middle tine 7a be longer than the outer tines and that the outer tines be of the same length and sufficiently spaced from ¾" to 1½" (inches) laterally from the middle tine to enable support of several of the middle fingers as will be described below.

In accordance with the invention, a finger support or gripping means 2 is provided on the tines 7 a predetermined distance from the handle 1 for receiving and supporting the fingers of the hand as shown in FIG. 1. It is preferred that the support be a rigid cross piece fixed to the tines 7, 7a in parallel to handle 1 as best shown in FIG. 2. Although the cross piece 2 is shown as a rod having a diameter of one-eighth to three-eighth inches, other cross-sections or even planar or contoured pieces or plates may be employed instead. In the preferred embodiment the cross piece has an outer surface spaced from the handle 1 a distance of one to one and one-half inches (1" to 1½"). In another embodiment shown in FIGS. 7 to 9 the support 2 and handle 1 may be one integral piece whose outer boundary surface is located on the tines 7 a distance of one to one and one-half inches (1" to 1½") from the handle portion 1.

The garden weeder is held loosely in the hand with the handle 1 resting in the palm. The reinforcing cross bar 2 being parallel to the handle 1 supports the extended index, fore and middle fingers which may rest on the bar 2 while the thumb underlies the handle. This simple arrangement allows the tool to become an extension of the hand. The cross bar 2 may be gripped when pulling or pushing the tool to apply needed force. The cross bar 2 may be attached to tines 5 by any reasonable means such as welding. The handle 1 may be made of wood, metal, plastic or some suitably durable material. The length of handle 1, diameter 6 and shape such as round or oval may vary to accommodate different size hands. The handle 1 or support 2 may or may not have some type of ridges, elevated grooves or contour to facilitate gripping or receipt of the fingers.

Figure 7:
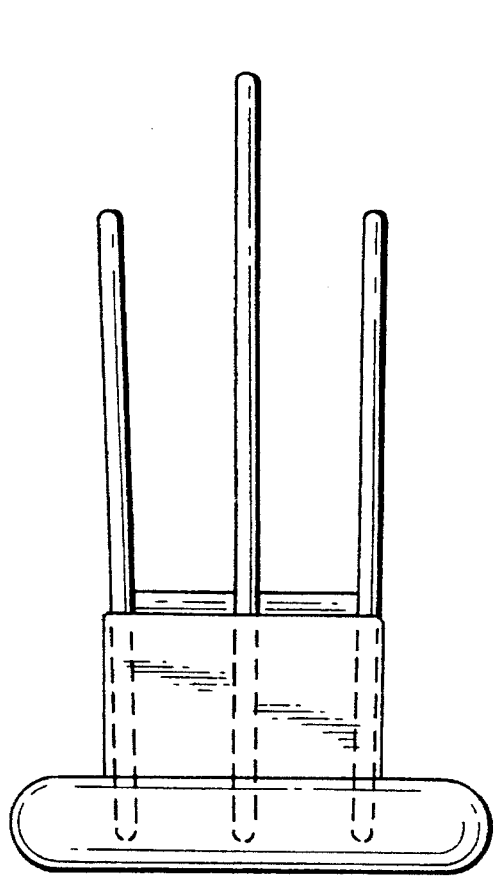
FIG. 7 is a bottom plan view of a weeding tool constituting a preferred embodiment of the present invention.
Figure 8:
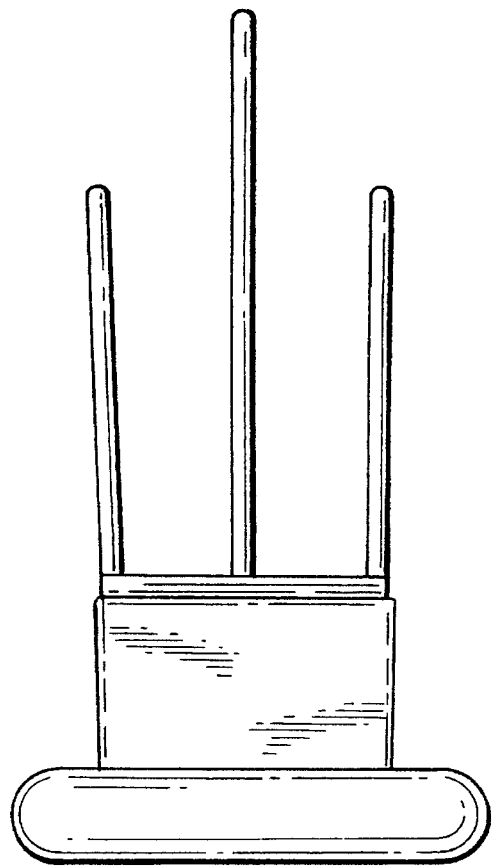
FIG. 8 is a top plan view of the weeding tool of FIG. 7.
Figure 9:
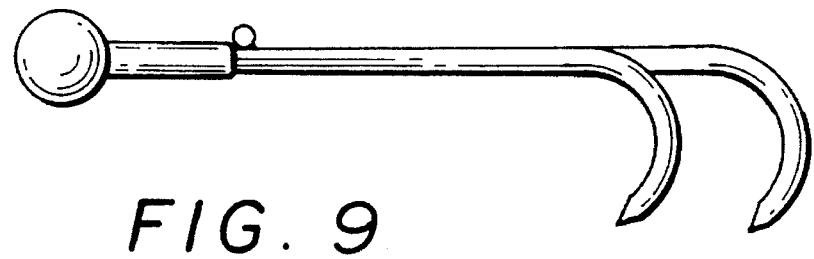
FIG. 9 is a side elevational view of the weeding tool of FIG. 7.

The cultivating or weeding tines 7 in this example may be made of a rigid material, for example, metal or plastic. Tines 7 may be secured to handle by any conventional means including but not limited to injection molding around them as shown in FIGS. 7 to 9, spiked and driven 4, welded or glued to name but a few. Length and diameter of tines 7, 7a as well as the curvature a points of the claws 3 may be of various sizes to facilitate handling or a particular function.

The present invention may be applied to simple hand held garden tools such as cultivating tines (as shown), a spade, a fork or other hand held garden tools.

Figure 4:
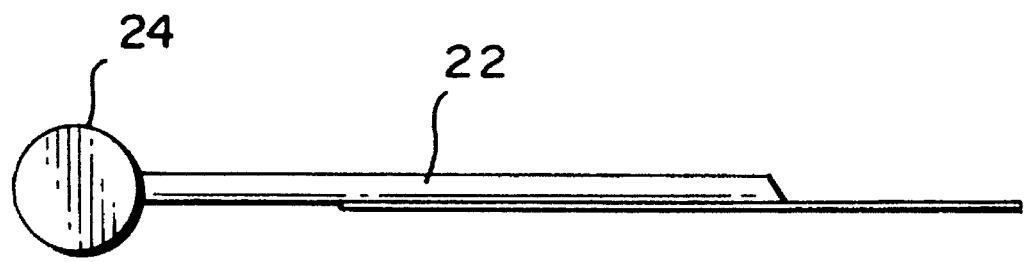
FIG. 4 is a side elevational view of another tool embodying the present invention.
Figure 5:
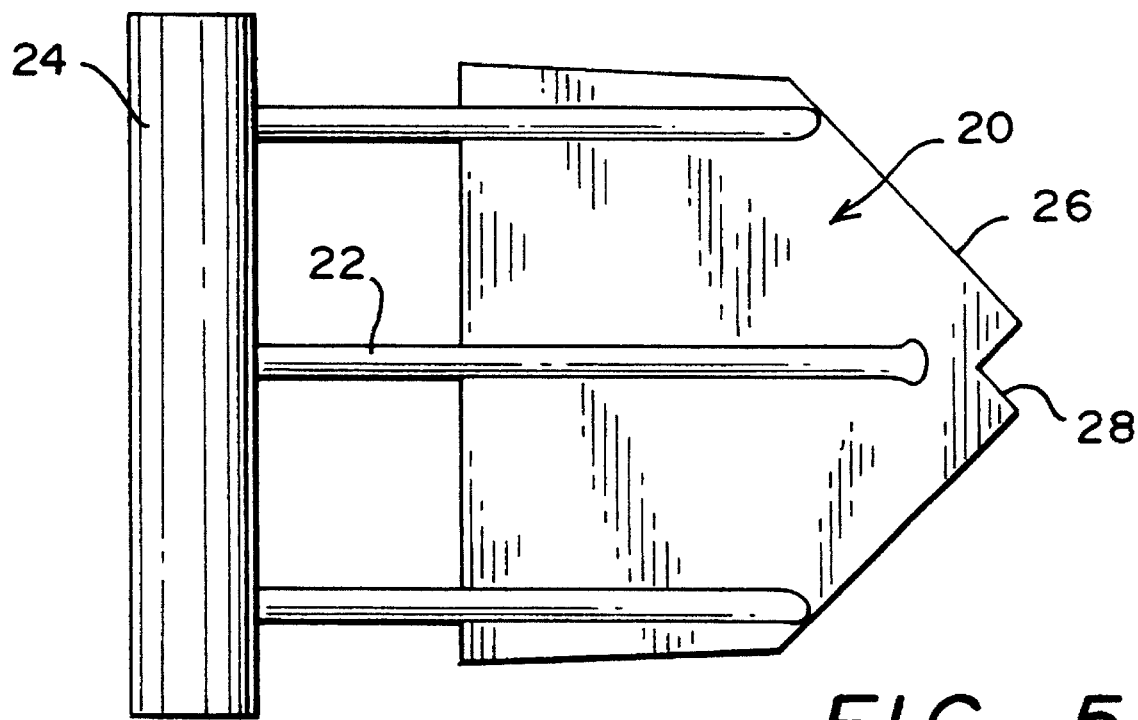
FIG. 5 is a plan view of the tool of FIG. 4.
Figure 6:
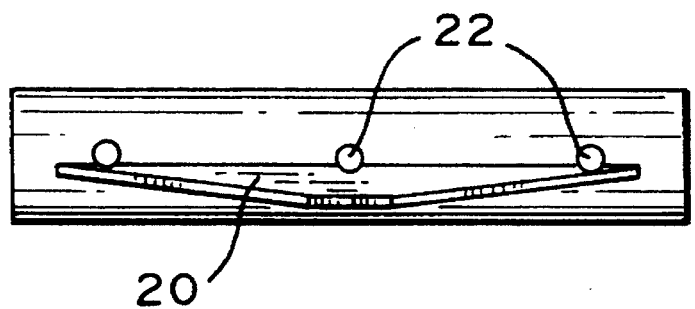
FIG. 6 is an end view of the tool of FIGS. 4 and 5.

Referring to FIGS. 4, 5 and 6, there is shown another hand tool embodying the present invention including a spade tool 20 of suitable rigid plate material fixed to three tines 22 which project forwardly from the handle 24. The spade tool 20 has portions spaced from the handle a distance of at least one to two inches so that the middle fingers may be supported on these portions and the spade may be worked like an extension of the hand. Tines 22 are not clawed as in the tool of FIG. 3 and are used only to support the spade tool 20. The latter has a V-shaped end edge 26 with a V-shaped notch 28 in the center.

Although a preferred embodiment of the invention has been shown and described, the invention need not be limited to such embodiment but rather the scope of the invention is defined in the appended claims.

I claim:

1. A hand held garden tool comprising in combination: a handle adapted to extend in and across the palm of one's hand with the thumb underlying and the fingers overlying the handle and extending forwardly, at least one tins fixed to and extending forwardly from the handle, and support means on the tins for receiving one or more middle fingers, said support means extending transversely of the tine to allow several fingers to engage and be supported thereby and wherein said support means is located on the tine and has a surface spaced from the handle a distance of one to two inches to receive the middle finger and wherein said handle has a generally planar portion extending forwardly to the support means and covering the space between the support means and the handle.

2. The tool defined in claim 1 including a plurality of tines extending from the handle and wherein said support means is fixed to each of the tines.

3. The tool defined in claim 2 with three tines generally parallel to each other and having downwardly extending claw portions at their extremities, said tines being laterally spaced from each other a distance of between three-quarters to one and one-half inches.

4. The tool defined in claim 1 wherein said support means is a rigid element spaced one to one and one-half inches from the handle.

5. The tool defined in claim 1 wherein said support means has a length sufficient to support the index, fore and middle fingers.

6. The tool defined in claim 1 wherein said handle is molded to said tine.

7. A hand held garden tool comprising in combination: a handle adapted to extend in and across the palm of one's hand with the thumb underlying and the fingers overlying the handle and extending forwardly, at least one tine fixed to and extending forwardly from the handle, and support means on the tine for receiving one or more middle fingers, said support means extending transversely of the tine to allow several fingers to engage and be supported thereby and wherein said support means is located on the tine and has a surface spaced from the handle a distance of one to two inches to receive the middle finger and a spade tool fixed to the tine and having surface portions including said support means spaced from the handle for supporting the middle fingers.

8. The tool defined in claim 7 wherein said spade tool includes a plate having a generally V-shaped forward edge for working earth.

9. The tool defined in claim 8 wherein said plate has a rear edge spaced from the handle a distance of one to two inches.

10. The tool defined in claim 7 including three tines projecting forwardly from the handle and said spade tool is fixed to and across the three tines.

11. A hand held garden tool comprising in combination: a handle adapted to extend in and across the palm of one's hand with the thumb underlying and the fingers overlying the handle and extending forwardly, a plurality of tines fixed to and extending forwardly from the handle, and support means fixed to the tines for receiving one or more middle fingers, said support means extending transversely of the tines to allow several fingers to engage and be supported thereby and wherein said support means is located on the tines and has a surface spaced from the handle a distance of one to two inches to receive the middle finger and wherein said handle extends forwardly to said support means and is molded around the tines.

12. The tool defined in claim 11 wherein said support means is a rigid element spaced one to one and one half inches from the handle.

13. The tool defined in claim 11 with three tines generally parallel to each other and having downwardly extending claw portions at their extremities, said tines being laterally spaced from each other a distance of between three-quarters to one and one-half inches.

14. A hand held garden tool comprising in combination: a handle adapted to extend in and across the palm of one's hand with the thumb underlying and the fingers overlying the handle and extending forwardly, at least one tine fixed to and extending forwardly from the handle, and support means on the tine for receiving one or more middle fingers, said support means extending transversely of the tine to allow several fingers to engage and be supported thereby, support means located on the tine and having a surface portion spaced from the handle a distance to receive the middle finger, and a spade tool fixed to the tine and having surface portions including said support means spaced from the handle for supporting the middle fingers.

15. The tool defined in claim 14 including three tines projecting forwardly from the handle, and wherein said spade tool is fixed to and across the three tines.

16. The tool defined in claim 15 wherein said spade tool includes a plate having a rear edge spaced from the handle a distance of one to two inches.

* * * * *

UNITED STATES PATENT AND TRADEMARK OFFICE
CERTIFICATE OF CORRECTION

PATENT NO. : 5,518,284
DATED : May 21, 1996
INVENTOR(S) : CLAUDIA S. LYNN

It is certified that error appears in the above-identified patent and that said Letters Patent is hereby corrected as shown below:

In Claim 1, in both lines 5 and 7, delete the word "tins" and substitute the word ---tine---.

Signed and Sealed this

Sixteenth Day of July, 1996

Attest:

BRUCE LEHMAN

Attesting Officer

Commissioner of Patents and Trademarks